April 22, 1952 — E. ROSNER — 2,593,700
FISHING REEL

Filed Sept. 27, 1946 — 2 SHEETS—SHEET 1

INVENTOR.
ERNEST ROSNER
BY Morris Spector
ATT'Y

April 22, 1952     E. ROSNER     2,593,700

FISHING REEL

Filed Sept. 27, 1946     2 SHEETS—SHEET 2

*INVENTOR.*
ERNEST ROSNER
BY
ATT'Y

Patented Apr. 22, 1952

2,593,700

UNITED STATES PATENT OFFICE 2,593,700

FISHING REEL

Ernest Rosner, Chicago, Ill.

Application September 27, 1946, Serial No. 699,692

7 Claims. (Cl. 242—84.5)

This invention relates to fishing reels in general and more particularly to the wind-up mechanism for such reels. It is one of the objects of the present invention to provide a simple winding clutch, and brake mechanism for fishing reels, particularly fly casting type of fishing reels.

Some fly casting types of fishing reels have heretofore been provided with a reciprocating or oscillating type of lever which could be actuated by one finger to produce a step by step winding or reeling in of the line. It is with such fishing reels that the present invention is concerned. It is an object of the present invention to provide a trigger operated wind-up mechanism which employs a simple type of gearing that does not easily get out of adjustment.

It is a further object of the present invention to provide a clutch and brake mechanism for use with fly casting reels wherein a simple spring pressed member between the driving and the driven parts of the mechanism is effective to provide an overrunning clutch between the reel spool and its driver.

It is a still further object of the present invention to provide an improved clutch mechanism in a fly casting reel wherein there is a slip friction coupling between the driving and the driven elements and wherein there is provided means for adjusting the tension of a spring that determines the magnitude of the friction coupling.

The attainment of the above and further objects of the present invention will be apparent from the following specification taken in conjunction with the accompanying drawing forming a part thereof.

In the drawings.

Reference may now be had more particularly to the drawings wherein like reference numerals designate like parts throughout.

Figure 1:
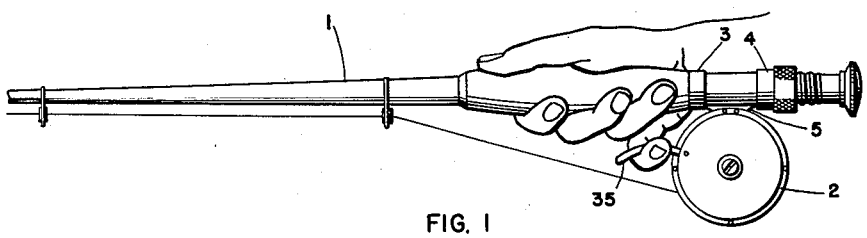
Figure 1 is a side view of the end of a fishing rod on which the present reel is applied.
Figure 2:
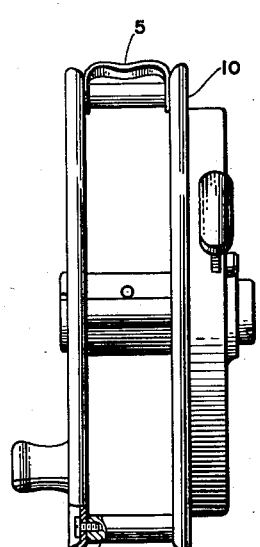
Figure 2 is an end view of the fishing reel of the present invention.
Figure 3:
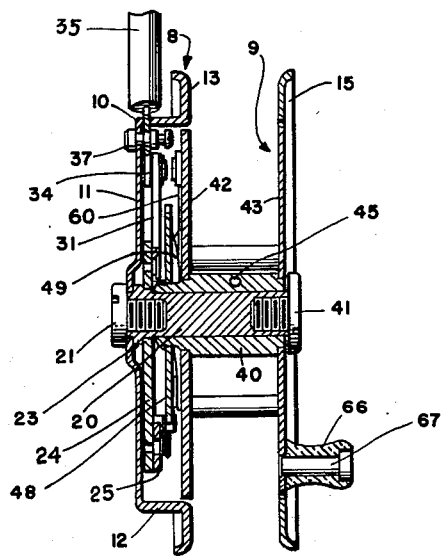
Figure 3 is a sectional view taken along the line 3—3 of Figure 4 and looking in the direction of the arrows.

In the drawings there is shown at 1 a conventional type of fly casting fishing rod to which a fishing reel 2 of the present invention is secured in the usual manner, as by means of a pair of rings 3—4 of which one is stationary and the other is longitudinally movable on the rod, said rings receiving the ends of a conventional reel seat 5 on the reel.

Figure 4:
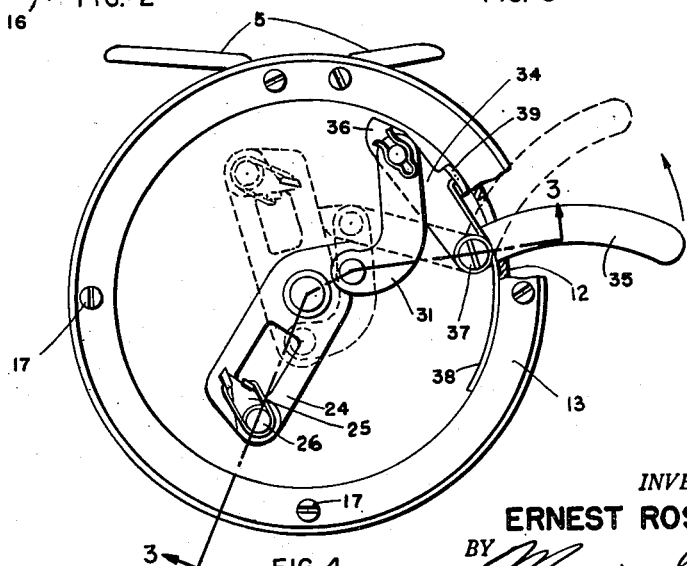
Figure 4 is a side view of the fishing reel with the spool thereof removed.
Figure 5:
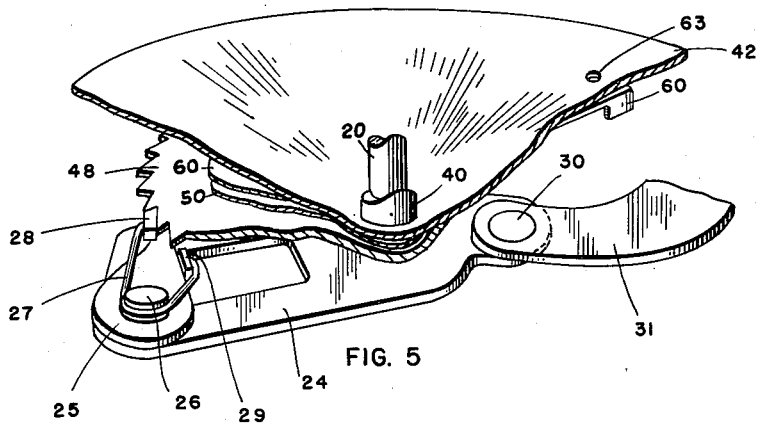
Figure 5 is a fragmentary perspective view of the pawl and ratchet driving mechanism.
Figure 6:
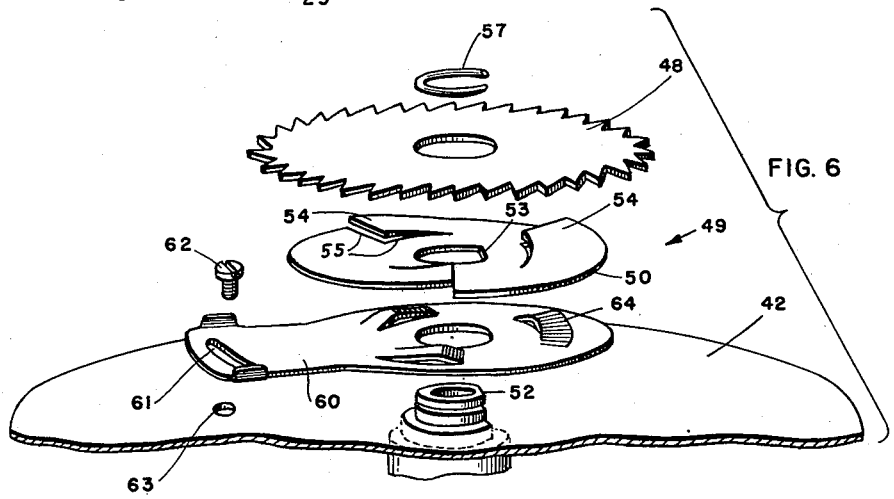
Figure 6 is an exploded view of the improved clutch mechanism.
Figure 7:
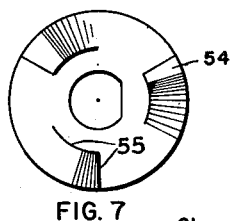
Figure 7 is a front view of the clutch spring of the fishing reel.
Figure 8:
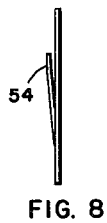
Figure 8 is an end view thereof.
Figure 11:
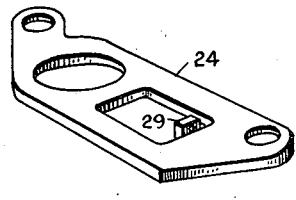
Figure 11 is a perspective view of the pawl carrier.
Figure 9:
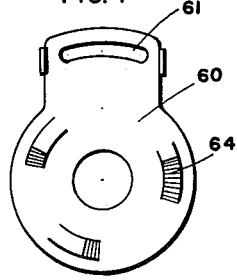
Figure 9 is a front view of the clutch spring adjusting cam.
Figure 10:
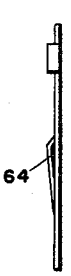
Figure 10 is an end view thereof.

The reel 2 of the present invention comprises a frame 8 on which is rotatably mounted a spool 9. The frame consists of a cup-shaped frame plate 10 having a back 11 and a cylindrical side 12 that terminates in a head flange ring 13. The head flange ring 13 has secured thereto a tail flange ring 15 in any desired manner as, for instance, by means of spacer posts 16 and screws 17 threaded thereinto, as is usual in fishing reels. At the center of the back 12 there is rigidly and non-rotatably mounted a spool shaft 20 as by means of a shaft screw 21 the shank of which threads into the spool 20 and the head of which bears against the plate 11. The shaft spool 20 has a peripheral flange 23 one face of which bears against the inside of the back 11. The opposite face of the flange 23 locates the position of a pawl carrier 24 that fits on the spool shaft and is freely rotatable thereon. The pawl carrier consists of a sheet metal stamping having a round hole fitting snugly around the spool shaft. At one end of the pawl carrier 24 there is pivoted a pawl 25 as by a pawl rivet 26 carried by the pawl carrier and serving as a fulcrum for the pawl 25. A pawl spring 27 is coiled about the pawl rivet 26. One end of the spring 27 bears against a lug 28 on the pawl and forces it in a direction clockwise as seen in Figure 5. The opposite end of the spring bears against a lug 29 which is an integral part of the pawl carrier 24 and extends upwardly therefrom. The lug 29 acts as a stop limiting the rotation of the pawl 25 in a direction clockwise as seen in Figure 5. The carrier 24 also has a flat head rivet 30 secured thereto which acts as a fulcrum for a link 31. The link 31 pivotally connects the pawl carrier 24 with an arm 34 of a bell crank trigger 35. The trigger is pivoted to the back 11 by a trigger fulcrum 37 consisting of a pin secured to the back 11. The trigger 35 extends through an oversized slot in the wall 12 so that the trigger may be turned about the trigger fulcrum 37. A spring 38 is coiled about the trigger fulcrum 37. One end of the spring bears against the inside periphery of the cylindrical side 12 of the frame plate and the other end of the spring bears against a lug 39 of the arm 34 to constantly urge the trigger in a direction clockwise as seen in Figure 4. The lug 39 is so located that as the outer end of the arm 34 approaches a position close to but not quite in contact with the cylindrical side 12 the lug 39 engages the side 12 and thus limits further turning of the trigger in a direction clockwise from the position illustrated in Figure 4.

The spool 9 is rotatably mounted upon the spool shaft 20. To that effect the spool 9 has a tubular hub shaft 40 which is adapted to slide over the spool shaft 20 and make a snug rotating fit thereon. The hub shaft bears against a short flange on the spool shaft whereby the hub shaft is kept out of engagement with the pawl carrier 24. A shaft screw 41 threads into the ends of the spool shaft 20 and holds the spool 9 against retraction from the spool shaft 20. The hub shaft has an inner reel disc or head plate 42 and an outer reel disc or tail plate 43 secured thereto in the usual manner. The fish line is wound about the spool between the discs 42—43, with the inner end of the line secured to the hub shaft as by being passed through an opening 45 therein, as is well known in the art.

A stamped metal ratchet 48 is rotatably mounted upon the hub shaft 40 and is adapted to be coupled with the spool by means of an overrunning friction clutch 49 located between the ratchet and the disc 42. The clutch 49 includes a spring disc plate 50 non-rotatably mounted on the hub shaft 40. To effect this non-rotatable mounting the hub shaft has a flat surface 52 formed thereon which cooperates with a flat surface 53 at a central hole in the clutch spring disc 50. The clutch spring disc 50 also has a series of spring fingers 54 bent outwardly from the plane of the clutch spring, which bending is facilitated by cutting through the spring metal along lines of cut 55. The fingers 54 bear against the inner side of the ratchet 48 and push the ratchet in a direction away from the disc 42. A lock spring ring 57 is sprung into a peripheral groove in the hub shaft 40 and acts as a limiting stop to prevent the spring disc 50 from pushing the ratchet 48 off of the end of the hub shaft 40.

A cam plate 60 is interposed between the spring disc plate 50 and the inner disc 42. This cam plate is centered on the hub shaft 40 and may be turned with respect to the hub shaft through a very limited angle as determined by an elongated arcuate slot 61 in the cam plate 60 through which slot extends a screw 62 that threads into a hole 63 in the inner disc 42. The cam plate 60 has a series of cams 64 formed therein, one for each spring finger 54. When the cam plate 60 and the clutch spring 50 are assembled the projecting cams 64 are located immediately under the respective upwardly projecting spring fingers 54 with the cams 64 bearing against the inner surfaces of the spring fingers 54 and with the outer surfaces of the spring fingers 54 bearing against the ratchet 38. Angular adjustment of the cam 60 with respect to the clutch spring disc 50 through the angle limited by the slot 61 serves to change the distance between the clutch spring 50 and the ratchet 48 and thereby to change the pressure between the spring fingers 54 and the ratchet.

In view of the fact that the spool 9 is freely rotatable on the spool shaft 20 it is apparent that any turning of the ratchet 48 will tend to drag the spool with it, the spring 50 acting as a slip friction clutch between the ratchet 48 and the end plate 42 of the spool 9. It is also apparent that the spool 9 may be turned manually even if the ratchet 48 is held stationary. When this is done the spring 50 will slide on the surface of the ratchet 48.

To facilitate turning of the spool the outer disc 43 is provided with a handle 66 rotatable upon a handle stud 67 that is secured to the outer disc 43. Turning of the handle 66 results in turning of the spool 42. When the spool is turned in a direction such as when stripping line the pawl 25 holds the ratchet 48 against turning and the clutch 49 acts as a brake to exert a noiseless drag against turning of the spool, the magnitude of the drag being determined by the tension of the spring fingers 54. When the spool is turned in the opposite direction, as when winding line, the ratchet 48 turns with the spool and as each tooth of the ratchet passes the pawl 25 it moves the pawl out of the way of a tooth, thus resulting in a clicking action.

The trigger 35 and the linkage connecting it with the ratchet of the spool 9 are effective for facilitating winding of the line on the spool. When the fishing rod is held in the manner indicated in Figure 1 the trigger 35 is in a position to be accessible by the small finger of the hand holding the rod. Each time the trigger 35 is pulled upwardly it moves from the position illustrated in full lines to that illustrated in dotted lines in Figure 4. In so moving the trigger arm 34 forces the link 31 downwardly and thus forces the pawl carrier 24 in turn in a direction clockwise as seen in Figure 4, from the position illustrated in full lines to the position illustrated in dotted lines, at which time the end 36 of the trigger arm 34 abuts against the pawl carrier 24 and limits further turning of the pawl carrier and limits further turning of the trigger. This limiting action is obtained due to the fact that the arm 34 and the pawl carrier 24 are in the same plane. During the movement of the trigger 34 from the full to the dotted line position the pawl 25 is in engagement with the teeth of the ratchet 48 and causes the ratchet to move with it, in this instance through an angle slightly less than 120°. When the trigger is released the spring 38 returns it and the associated linkage from the dotted line position of Figure 4 to the full line position. As it moves to that position the pawl 25 rides over the teeth of the ratchet, clicking past each tooth under the action of the spring 27, but not dragging the ratchet with it due to the fact that the ratchet is coupled to the spool by the clutch 49. If there is no drag on the fishing line each turn of the trigger may move the spool through an angle appreciably more than 120° due to the fact that as the trigger moves and the pawl imparts motion to the ratchet the ratchet may have considerable inertia when the pawl reaches its limit of motion. The ratchet, with the spool attached, may therefore continue to travel under its inertia.

From the above description it is apparent that I have provided a simple and economical mechanical drive between the trigger 35 and the spool 9. The essential parts of the driving connection may be made of simple stampings and there are but few parts that can get out of order. If it is desired to adjust the tension of the spring clutch it is merely necessary to loosen a single screw and then slip the spool out of the reel. The spool carries with it the clutch and the ratchet 48.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A fishing reel comprising a rotatable spool, a pawl and ratchet mechanism for actuating the spool, said mechanism including a ratchet mounted for rotation about an axis coincident with the axis of rotation of the spool and rotatable with respect to the spool, a spring disc between the ratchet and the spool for causing the ratchet to exert a friction drag on the spool, said spring disc having a plurality of spring fingers extending out of the plane of the disc, an adjustable cam disc backing the spring disc and having camming surfaces cooperating with the spring fingers to control the forces exerted thereby, said two discs being angularly adjustable to vary the forces exerted by the spring fingers, and means for locking the two discs against relative movement with respect to one another out of their adjusted positions.

2. A fishing reel comprising a rotatable spool, a pawl and ratchet mechanism for actuating the spool, said mechanism including a ratchet rotatably mounted on the spool for rotation about an axis coincident with the axis of rotation of the spool, a spring disc between the ratchet and the spool and non-rotatable with respect to the spool for causing the ratchet to exert a friction drag on the spool, said spring disc having a plurality of spring fingers extending out of the plane of the disc, an adjustable cam disc mounted on the spool and backing the spring disc and having camming surfaces cooperating with the spring fingers to control the forces exerted thereby, said cam disc being angularly adjustable on the spool to vary the forces exerted by the spring fingers, and means for locking the disc in its angularly adjusted position on the spool.

3. A fishing reel comprising a cup-shaped frame plate, a spool shaft mounted thereon, a spool rotatable on the shaft, said spool having inner and outer discs of which the inner disc comprises substantially a closure for the cup-shaped frame plate, a spool driving ratchet mounted on the spool but rotatable about the central axis thereof, a spring friction clutch between the ratchet and the inner disc establishing a slip friction coupling between the ratchet and the spool, said clutch comprising a spring between the ratchet and the spool and causing the ratchet to exert a friction drag on the spool, said spring disc having a plurality of spring fingers extending out of the plane of the disc, and an adjustable cam disc backing the spring disc and having camming surfaces cooperating with the spring fingers to control the forces exerted thereby, said two discs being angularly adjustable to vary the forces exerted by the spring fingers.

4. A fishing reel comprising a cup-shaped frame plate, a spool shaft mounted thereon, a spool rotatable on the shaft, said spool having inner and outer discs of which the inner disc comprises substantially a closure for the cup-shaped frame plate, a spool driving ratchet mounted on the spool but rotatable about the central axis thereof, a spring friction clutch between the ratchet and the inner disc establishing a slip friction coupling between the ratchet and the spool, said clutch comprising a spring between the ratchet and the spool and causing the ratchet to exert a friction drag on the spool, said spring disc having a plurality of spring fingers extending out of the plane of the disc, an adjustable cam disc backing the spring disc and having camming surfaces cooperating with the spring fingers to control the forces exerted thereby, said two discs being angularly adjustable to vary the forces exerted by the spring fingers, and means for locking the two discs against relative movement with respect to one another out of their adjusted positions.

5. A fishing reel comprising a cup-shaped frame plate, a spool shaft mounted thereon, a spool rotatable on the shaft, said spool having inner and outer discs of which the inner disc comprises substantially a closure for the cup-shaped frame plate, a spool driving ratchet mounted on the spool but rotatable about the central axis thereof, a spring friction clutch between the ratchet and the inner disc establishing a slip friction coupling between the ratchet and the spool, said clutch comprising a spring between the ratchet and the spool and causing the ratchet to exert a friction drag on the spool, said spring disc having a plurality of spring fingers extending out of the plane of the disc, an adjustable cam disc backing the spring disc and having camming surfaces cooperating with the spring fingers to control the forces exerted thereby, said two discs being angularly adjustable to vary the forces exerted by the spring fingers, a pawl carrier mounted in said cup-shaped frame plate for rotation about an axis coincident with the spool axis, a pawl on said carrier cooperating with said ratchet, an operating trigger pivoted on the inside of the frame plate and projecting therefrom, and a link connecting the trigger with the pawl carrier.

6. A fishing reel comprising a cup-shaped frame plate, a spool shaft mounted thereon, a spool rotatable on the shaft, said spool having inner and outer discs of which the inner disc comprises substantially a closure for the cup-shaped frame plate, a spool driving ratchet mounted on the spool but rotatable about the central axis thereof, a spring friction clutch between the ratchet and the inner disc establishing a slip friction coupling between the ratchet and the spool, said clutch comprising a spring between the ratchet and the spool and causing the ratchet to exert a friction drag on the spool, said spring disc having a plurality of spring fingers extending out of the plane of the disc, an adjustable cam disc backing the spring disc and having camming surfaces cooperating with the spring fingers to control the forces exerted thereby, said two discs being angularly adjustable to vary the forces exerted by the spring fingers, means for locking the two discs against relative movement with respect to one another out of their adjusted positions, a pawl carrier mounted in said cup-shaped frame plate for rotation about an axis coincident with the spool axis, a pawl on said carrier cooperating with said ratchet, an operating trigger pivoted on the inside of the frame plate and projecting therefrom, and a link connecting the trigger with the pawl carrier.

7. A fishing reel comprising a rotatable spool, a pawl and ratchet mechanism for actuating the spool, said mechanism including a ratchet mounted for rotation about an axis coincident with the axis of rotation of the spool and rotatable with respect to the spool, a spring disc between the ratchet and the spool for causing the ratchet to exert a friction drag on the spool, and an adjustable cam disc for controlling the force exerted by the spring disc, said two discs being angularly adjustable, and means for locking the two discs against relative movement with respect to one another out of their adjusted positions.

ERNEST ROSNER.

REFERENCES CITED

The following references are of record in the file of this patent:

UNITED STATES PATENTS

| Number | Name | Date |
|---|---|---|
| 873,784 | Reichardt | Dec. 17, 1907 |
| 1,603,306 | Adams | Oct. 19, 1926 |
| 1,943,981 | Maynes | Jan. 16, 1934 |
| 2,263,237 | Fiscus | Nov. 18, 1941 |
| 2,428,908 | Cooper et al. | Oct. 14, 1947 |

FOREIGN PATENTS

| Number | Country | Date |
|---|---|---|
| 22,420 | Great Britain | Oct. 2, 1913 |
| 103,216 | Australia | Feb. 24, 1938 |